United States Patent [19]

Guerrini et al.

[11] 4,258,156

[45] Mar. 24, 1981

[54] METHOD OF FABRICATION OF A TRANSPARENT LAMINATED PRODUCT

[75] Inventors: Jacques Guerrini, Chilly Mazarin; Jeanne Berthet, Velizy Villacoublay; Gilbert Gaussens, Meudon; Francis Lemaire, Chatillon, all of France

[73] Assignee: Commissariat a l'Energie Atomique, Paris, France

[21] Appl. No.: 956,645

[22] Filed: Nov. 1, 1978

[30] Foreign Application Priority Data

Nov. 3, 1977 [FR] France ............................. 77 33008

[51] Int. Cl.³ ............................................. C08L 63/00
[52] U.S. Cl. ............................................. 525/531; 156/99; 156/105; 156/106; 156/272; 156/299; 156/311; 428/412; 428/413; 428/415; 428/417; 428/426; 428/520; 428/522; 428/913; 525/529; 525/530; 525/922
[58] Field of Search .............. 260/836, 837 R; 156/99, 156/105, 106, 299, 272, 311; 428/412, 413, 415, 417, 426, 520, 522, 913; 525/529, 530, 922, 531

[56] References Cited

U.S. PATENT DOCUMENTS

| | | | |
|---|---|---|---|
| 2,236,046 | 3/1941 | Watkins | 156/99 |
| 2,837,454 | 6/1958 | Watkins et al. | 156/99 X |
| 3,317,465 | 5/1967 | Doyle | 525/531 |
| 3,373,075 | 3/1968 | Fekete | 525/531 |
| 3,406,086 | 10/1968 | Foster | 428/412 |
| 3,432,478 | 3/1969 | May | 525/531 |
| 3,458,388 | 7/1969 | Moynihan | 428/412 X |
| 3,532,590 | 10/1970 | Priddle | 428/412 |
| 3,929,927 | 12/1975 | Marans | 525/531 |
| 3,965,211 | 6/1976 | Harris et al. | 428/415 X |
| 3,976,615 | 8/1976 | Sekmakas | 525/531 |
| 4,120,839 | 10/1978 | Emmons et al. | 260/836 X |
| 4,126,504 | 11/1978 | Wolinski et al. | 260/836 X |
| 4,126,596 | 11/1978 | Schimmel et al. | 260/837 R |

FOREIGN PATENT DOCUMENTS

| | | | |
|---|---|---|---|
| 45-15988 | 6/1970 | Japan | 525/531 |
| 49-93417 | 9/1974 | Japan | 525/529 |

*Primary Examiner*—Paul Lieberman
*Attorney, Agent, or Firm*—Kerkam, Stowell, Kondracki & Clarke

[57] ABSTRACT

The method of fabrication of a laminate formed by at least two transparent sheets consists in forming a stack of sheets after coating the sheet interfaces with a polymerizable adhesive, in subjecting the stack to an overpressure below or equal to 2 bar, in maintaining at the same time a temperature T below the maximum temperature of stability of the adhesive for a sufficient period of time to obtain prepolymerization of the adhesive, then in maintaining the stack temperature below or equal to the temperature T for a period of less than sixteen hours.

8 Claims, 2 Drawing Figures

METHOD OF FABRICATION OF A TRANSPARENT LAMINATED PRODUCT

This invention relates to a method and means for the fabrication of a transparent laminated product as well as to a transparent laminated product.

In accordance with the invention, a transparent laminated product is understood to designate a flat or non-flat product constituted by a stack of at least two sheets of material through which light is permitted to pass, these sheets being bonded together in accordance with standard practice.

The definition just given extends to several types of products, the best known example being laminated glass.

Laminated glass is known in particular by the registered trademark "Triplex". It is known that this product is constituted by a sandwich comprising a plastic film placed between two glass plates which adhere to the plastic film. In the majority of instances, the plastic film consists of polyvinyl butyral. In a more general sense, the term "laminated glass" must be understood to designate a transparent sandwich made up of n glass plates and n−1 plastic films in which a plate and a film are disposed in alternate sequence. There must be added to the laminated glass proper a similar product in which at least one of the plates or sheets is replaced by a rigid sheet of polycarbonate.

The invention is also concerned with a laminated product constituted directly by the juxtaposed arrangement of glass sheets and/or polycarbonate sheets without interposition of a plastic film between two consecutive sheets.

The laminated glass can be produced in the form of a flat plate. This is the case of glasses employed in particular in buildings. The glass can also be provided in a non-flat form, for example in the case of automobile windshields.

The glass laminate must have certain characteristics which depend on its intended use. The main prerequisites are as follows:

In regard to adhesion between the glass plates and the plastic film, it is necessary to ensure that the glass fragments do not become detached from the film after hammering. This characteristic feature is required especially in the manufacture of automobile windshields.

Furthermore, there must not be any modification of the optical properties of the product in the course of time. In particular, there must not be any yellowing under the action of light.

Finally, the laminated glass must have good resistance to bad weather. This resistance is established by the successive application of accelerated tests, namely two hours of immersion in boiling water and one hundred hours of exposure to a dry heat atmosphere at 120° C.

It is apparent that this product can have a very large number of applications as mentioned in the foregoing. To these can be added the manufacture of display windows constituted by theft-proof glasses or bullet-proof glasses and finally the interior and exterior decoration of buildings.

It is further apparent that this glass is employed or intended to be employed in very large quantities and that it is of primary importance to resort to a method of fabrication of laminated glass which permits industrial manufacture in large-scale production and minimizes capital costs. This means that each step of the method for obtaining the laminated glass must be carried out under cost conditions which are as low as possible and especially that handling operations must be avoided.

Laminated glass has been manufactured up to the present time in accordance with a known process by melting a plastic film (which is almost exclusively of polyvinyl butyral as mentioned earlier) between the glass plates. The manufacturing process entails the following operations: washing of the plastic film followed by dewatering and drying of the film; assembly of the glass plates and the plastic film; removal of air and gas bubbles which necessarily remain between the plastic film and the glass plates. This is performed either under a pressure of 1 to 4 bar at a temperature of 40° to 90° C. or under vacuum at a temperature of the order of 110° C.; there is then a bonding operation which corresponds to fusion-bonding of the plastic film. This operation is performed under a pressure of 10 to 14 bar at a temperature of 120° to 140° C. followed by slow cooling under pressure until a temperature of the order of 40° C. is obtained. The complete operation lasts from 3 to 6 hours. The final step consists in trimming and washing the end product.

These different steps of the known method correspond to two principal operations: on the one hand a calendering operation corresponding to the removal of air bubbles and on the other hand the autoclave-processing operation which corresponds to bonding. The calendering operation is usually performed between parallel rolls which exert pressure along generating-lines defining the surface of the laminated glass which has previously been formed. In the case of automobile windshields, this is a manual operation in which each part has to be guided by hand one after the other. Moreover, it can be understood that the pressure is not applied in a continuous and uniform manner. Thus the quality of adhesion of the glass plates to a plastic film or rather its pre-adhesion is irregular, insufficient or even non-existent at certain points, even in the case of flat products. The manufacturing tolerances of the glass product, namely the variations in thickness or in surface flatness in the case of flat products or variations in thickness or in radius of curvature in the case of products such as automobile windshields, give rise to the above-mentioned variations in adhesion. Moreover, by reason of this irregular application of pressure, internal air pockets are eliminated to a greater or lesser extent. Bubbles remain all the more readily by virtue of the fact that glass products revert to their initial shape as a result of their inherent elasticity, after the local and momentary application of a linear pressure. It is also understood that, since a local pressure is applied to the glass product, it is more difficult to employ thin glass sheets as constituent material of the end product by reason of the local stresses which are introduced.

In regard to the autoclave operation which is performed under vacuum or under pressure, the object of this operation is to improve the adhesion and intimate contact of the laminated glass components and controlled melting of the plastic film. However, this improvement remains dependent on the above-mentioned tolerances of the glass product. Furthermore, a limitation is imposed on the size of laminated glass sheets which can be formed by reason of the fact that the product has to be placed within an autoclave.

It is understood that these operations often produce uncertain results and in any case entail high capital cost.

The precise aim of the present invention is to provide a method of fabrication of a transparent laminated product which overcomes the above-mentioned disadvantages by guaranteeing a quality of the end product in accordance with the foregoing specifications while involving a small number of relatively simple operations performed at low cost.

In accordance with an essential feature of the invention, the method is distinguished from the known method of the prior art in that bonding of the final stack of sheets is no longer obtained by melting of a plastic film between two plates of glass or polycarbonate but is obtained by bonding glass or polycarbonate sheets with or without plastic film or films by means of an adhesive substance. A polymerizable adhesive substance is employed for this purpose and polymerizes under a pressure within the range of 0.1 to 2 bar at a temperature below T at the end of a time interval within the range of 1 to 16 hours in such a manner as to ensure that melting of the plastic film does not take place. The adhesive substance can be used to coat either the sheets constituting the stack or the plastic film or films (when provision is made for such films).

In more precise terms, the maximum temperature T is defined by the temperature at which the adhesive substance is no longer stable. Taking into account the compositions of the adhesive substance employed, T has a value of approximately 80° C. (temperature of transition to the unstable state of the tertiary amine employed). However, as will be shown in the following description, very good results are obtained by operating within a distinctly lower temperature range between 10° C. and 50° C.

More specifically, the method in accordance with the invention for fabricating a transparent laminated product constituted by the assembly of at least two sheets of material through which light is permitted to pass essentially consists in forming a stack of said sheets after having coated the face or faces of said sheets which constitute interfaces within said stack with a polymerizable adhesive substance, in applying to said stack an overpressure below or equal to 2 bar and in maintaining at the same time a temperature T below the maximum temperature of stability of the adhesive substance during a sufficient period of time to obtain prepolymerization of said adhesive substance and in then maintaining said stack at a temperature below or equal to the temperature T during a period of time which is less than 16 hours.

As indicated earlier, provision can be made for only a certain number of rigid sheets, in which case flexible plastic films are intercalated between the rigid sheets. Alternatively, all the sheets can be rigid, in which case no provision is made for equivalent plastic films.

In the method according to the invention, the different steps of the method of fabrication in the case of laminated glass consist of the following operations: washing of the plastic film, dewatering of the film, pressing of the film in order to provide this latter with a smooth surface, calendering being performed at a temperature of 70° to 80° C., assembly of the glass and the plastic film by coating the glass plates with an adhesive substance by means of conventional paint spray coating equipment and hardening of the adhesive substance under a pressure of 0.1 to 2 bar at a temperature within the range of 10° to 50° C. for a period of time within the range of 1 to 16 hours.

It will readily be apparent that the calendering operation is necessary only if the plastic film provided is not smooth. Moreover, uniformity of thickness of the plastic film can be improved by sand-blasting.

Another important result obtained by the practical application of the method lies in the fact that, although the film of butyral (when this latter exists) is not transparent by itself and although this butyral film does not melt during the different steps of the method, a transparent product having substantially the same optical quality as a polished glass is nevertheless obtained.

In accordance with a preferred embodiment, hardening of the adhesive substance after spreading which is performed under a maximum pressure of 2 bar as mentioned earlier is obtained by placing the stack defined above within a flexible leak-tight bag and applying a relative external overpressure to said bag while maintaining a communication between the interior of this latter and the exterior so as to permit removal of the air contained within the bag and especially removal of air or gas bubbles which are trapped between the plastic film or films and the glass plates.

In a preferred embodiment, the relative pressure is obtained by immersing said bag in a volume of liquid to a sufficient depth to attain the desired hydrostatic pressure while permitting free discharge of air from the bag. It is understood that application of this relative pressure can effectively be obtained at very low cost by means of this expedient. Moreover, the pressure applied to the plate as a whole is substantially identical at each point. This accordingly avoids the introduction of localized stresses which would be liable to result in breakage of the glass and is thus conducive to the use of thin glasses. A further advantage of this mode of application of pressure lies in the fact that, at the time of progressive immersion of the glass sandwich within its bag, the pressure is applied progressively to the plate, thus inducing the expulsion of air bubbles trapped within the adhesive substance between the plastic film or films (if these latter exist) and the glass (or polycarbonate) plates or else between the rigid sheets (glass or polycarbonate) since this adhesive substance has not yet reached a prepolymerization stage.

In accordance with a preferred feature of the method which forms the subject of the invention, the adhesive substance employed contains a basic epoxy resin and tertiary amine methacrylate. This pair of products has the main advantage of polymerizing only in certain proportions in time.

In alternative modes of preparation of the adhesive substance, this latter can also contain a polyunsaturated monomer in order to increase the reactivity of the adhesive substance, that is to say in order to reduce the hardening time, a polar monomer in order to increase the adhesion of the glass to certain materials and various products such as peroxides with a view to increasing the reactivity, or polymerization inhibitors in order to increase the period of preservation of the adhesive substance prior to use.

Finally, in the event that the glass is of small thickness, it may prove advantageous to subject the sandwich to ultraviolet radiation at the time of polymerization.

The present invention is also concerned with an adhesive substance as defined in the foregoing and particularly suitable for bonding glass or polycarbonate plates to the plastic film or bonding plates together. However, the adhesive substance can have other uses when it is desired to bond glass to other materials such as wood, metal, concrete, glass and so forth.

The invention is finally concerned with the end product which consists of a transparent laminated product as essentially constituted by a stack of at least two sheets of material through which light is permitted to pass, the interfaces of the sheets being constituted by a layer of polymerized adhesive substance. As can readily be understood, said product can be either flat, curved or convex. Preferably, the plastic film or films (when these latter exist) are constituted by polyvinyl butyral, although PVC can also be employed.

A more complete understanding of the invention will in any case be gained from the following description of a number of embodiments of the invention which are given by way of example and not in any limiting sense, reference being had to the accompanying drawings, wherein.

Figure 1:
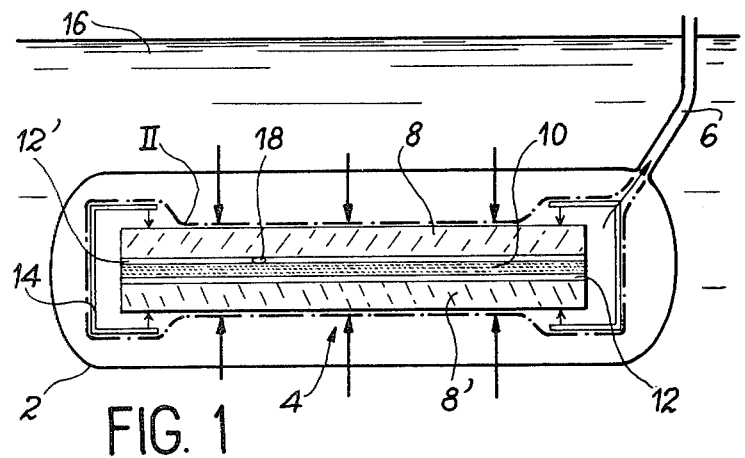
FIG. 1 is a very general view showing a simplified device for applying pressure to the laminated glass.

There will first be described the different types of adhesive substance which can be employed, depending on whether the substance is to be used in the actual fabrication of a transparent laminated product or whether it is more generally intended for bonding a glass sheet or plate to another material.

In accordance with the invention and as mentioned earlier, the adhesive substance which will be designated hereinafter as "the adhesive" is constituted by a basic resin (acrylic ester of epoxy resin) and by tertiary amine methacrylate. This tertiary amine is selected from the group comprising diethylaminoethyl, dimethylaminoethyl and tert-butylaminoethyl. This pair of products has the main advantage of polymerizing alone in time. To this basic formulation can be added various other products such as: a polyunsaturated monomer for increasing the reactivity of the resin or in other words for decreasing the hardening time. A polar monomer can also be added in order to increase adhesion to certain materials. Finally, it is possible to add various products such as peroxides in order to increase the reactivity or polymerization inhibitors for the purpose of increasing the period of preservation of the resin prior to use.

The basic resin of the epoxy-acrylate type is either:

(a) an Ebecryl 600-UCB resin.

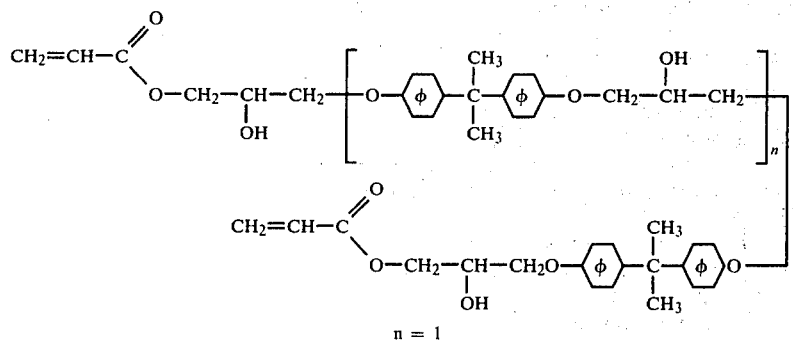

(b) a resin obtained by addition of two moles of bisphenol-A diglycidylether with one mole of linoleic acid dimer.

After modification by acrylic acid, the resin is of the form:

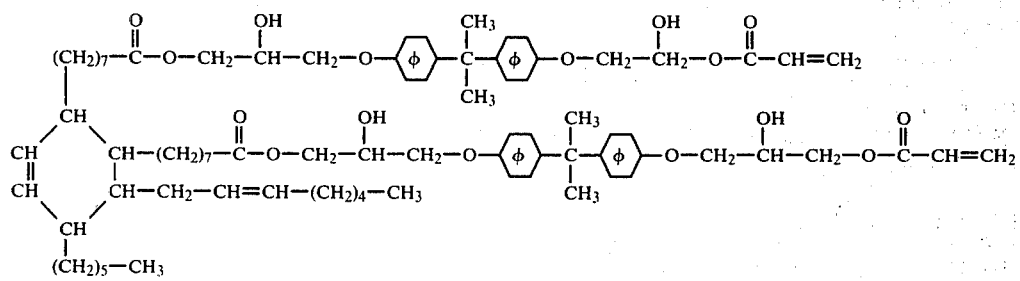

This unsaturated epoxy resin has a double bond index within the range of 0.03 to 0.30.

(c) acrylic ester of Shell epoxy resin

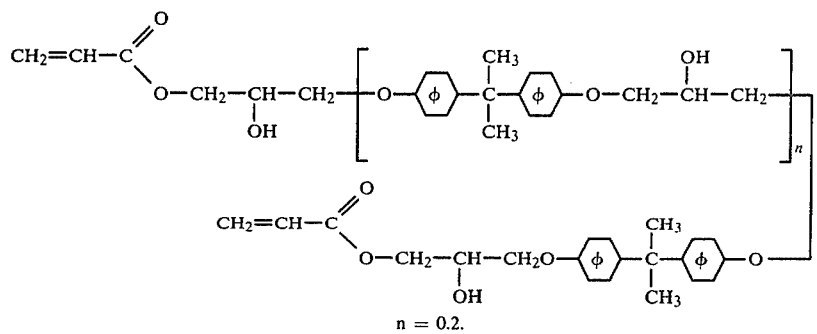

n = 0.2.

This basic resin represents 20 to 60% of the adhesive.

The tertiary amine dimethylmethacrylate which forms the reaction pair with the epoxy-acrylic resin or resins represents 40 to 80% of the adhesive.

The polar monomer is either ethylene glycol acrylate or ethylene glycol methacrylate. It can represent 0 to 20% by weight of the adhesive.

The polyunsaturated monomer is selected from the group comprising: diethylene glycol diacrylate, tetraethylene glycol diacrylate, polyethylene glycol diacrylate, hexanediol diacrylate, pentaerythrytol tetraacrylate.

The monomer can represent 0 to 15% by weight of the adhesive.

The peroxide is selected from the group comprising: lauroyl peroxide, benzoyl peroxide, p-chlorobenzoyl peroxide.

The polymerization inhibitor is either hydroquinone or hydroquinone monomethylether. This inhibitor can represent 0 to 1% by weight of the adhesive.

There will now be described a certain number of examples of execution of the method and of application of the adhesive, consideration being essentially given in a first stage to the chemical aspect.

EXAMPLE 1

Fabrication of a transparent laminated product constituted by two glass plates and a plastic film of polyvinyl butyral.

The film was preformed by calendering at 80° C. between two sheets of polyester which do not adhere to the plastic film. An adhesive having the following composition is employed: 50% of a commercially available saturated epoxy resin modified by acrylic acid, 49.8% dimethylaminoethyl methacrylate and 0.2% hydroquinone.

After applying a layer of adhesive having a thickness of approximately 15 microns by conventional coating means and assembling so as to form a sandwich, this latter is placed within a flexible bag which is immersed as mentioned earlier while being maintained at an ambient temperature of the order of 20° C. for a sufficient period of time to reach a stage of prepolymerization or pregelation of the adhesive. In the example, this period is of the order of one hour. The bag is then withdrawn, the sandwich being removed from the bag and allowed to stand at room temperature for a certain period of time. At the end of a total period of the order of 16 hours, the adhesive is completely polymerized and ensures perfect glass-to-plastic film adhesion. A hammering test shows that the broken glass remains perfectly bonded to the plastic film. Resistance to bad weather conditions is good. After several weeks of exposure to sunlight, there is no evidence of yellowing of the glass laminate which has thus been formed.

It is understood that immersion in the deformable bag has a double function: on the one hand, the necessary pressure can be applied to the sandwich in order that the plastic film can be maintained in contact with the glass plates until incipient polymerization of the adhesive (prepolymerization) has taken place. When this prepolymerization stage has been reached, it is no longer necessary to apply this pressure. The second function of this pressure application is to drive out the air bubbles which are almost inevitably trapped between the plastic film and the glass plates and therefore within the adhesive at the moment of positioning of the different elements.

Since pressure is applied at the very outset of the polymerization process (prior to prepolymerization), the adhesive has sufficient fluidity to permit removal of the bubbles by application of this low pressure. Finally, it can be understood that the mode of application of pressure makes it possible to ensure wholly uniform pressure at all points of the glass plates. It is readily apparent that, as mentioned earlier, the interior of the immersed bag is connected to the surrounding air in order to permit removal of the air from said bag as the pressure is being applied.

EXAMPLE 2

The same test as in Example 1 is again performed but by employing a glass-polycarbonate sandwich, the plastic film being of polyvinyl butyral. The polycarbonate is of the Tuffak type produced by Rohm and Haas.

The same adhesive composition is employed.

The procedure and results are exactly the same as in Example 1 and replacement of glass by polycarbonate does not affect the optical properties or the mechanical properties of the laminated product finally obtained.

EXAMPLE 3

Fabrication of a glass laminate in which the plastic film is of polyvinyl butyral.

The film was preformed by calendering as indicated in the foregoing. The adhesive is constituted by 45% of a commercially available saturated epoxy resin modified by acrylic acid and 55% of dimethylaminoethyl methacrylate.

After coating and assembling, the sandwich is treated by the means described above under a pressure of 0.5 bar at 40° C. At the end of three hours, the adhesive is completely polymerized and ensures perfect adhesion of glass to plastic film. Hammering tests show that the broken glass remains perfectly bonded to the plastic film. Resistance to bad weather conditions is good and no phenomenon of yellowing is observed after exposure to sunlight.

EXAMPLE 4

The same test as in Example 3 is performed by replacing one of the glass plates by a polycarbonate plate. The composition of the adhesive is retained and the operating conditions are the same.

The product obtained has the same characteristics as in Example 3.

EXAMPLE 5

This example is identical with Example 2 apart from the fact that the composition of the adhesive is as follows:

50% of a commercially available epoxy-acrylate resin of the type designated as Ebecryl-600,
50% dimethylaminoethyl methacrylate.

The same quality of laminated product is obtained.

EXAMPLE 6

This example is identical with Example 5 but the plastic film of butyral is replaced by a plastic film of PVC which is already calendered prior to delivery.

The laminated product obtained exhibits the same mechanical and optical properties.

EXAMPLE 7

Fabrication of a glass laminate in which the plastic film is of polyvinyl butyral.

The film is preformed by calendering as indicated in the foregoing. The adhesive has the following composition:

10% of a commercially available saturated epoxy resin modified by methacrylic acid;
40% of a commercially available epoxy-acrylate resin of the type designated as Ebecryl-600;
49% dimethylaminoethyl methacrylate;
1% lauroyl peroxide.

After coating and assembling, the sandwich is placed within a flexible bag as indicated earlier, the bag being maintained at ambient temperature, that is to say at a temperature of the order of 20° C. After application of the pressure up to the prepolymerization stage, the overpressure is no longer applied and the glass laminate is maintained at room temperature. At the end of sixteen hours, the adhesive is completely polymerized and the tests are also very favorable.

EXAMPLE 8

Fabrication of a glass laminate in which the plastic film is PVC.

After forming of the plastic film, an adhesive having the following composition is employed:

5% of a commercially available saturated epoxy resin modified by acrylic acid;
40% of a commercially available epoxy-acrylate resin of the type designated as Ebecryl-860;
10% polyethylene glycol diacrylate;
45% dimethylaminoethyl methacrylate.

After sixteen hours of polymerization under the conditions of the preceding examples, the adhesive has completely polymerized and ensures perfect adhesion of the plastic film to the glass plates.

EXAMPLE 9

This example is identical with Example 4 but the composition of the adhesive is modified and is accordingly as follows:

45% of a commercially available saturated epoxy resin modified by acrylic acid;
55% tert-butylaminoethyl methacrylate.

There is again obtained a laminated product having a thin plastic film which exhibits the same properties as in the previous examples.

EXAMPLE 10

The bonding-together of two glass plates without incorporation of the plastic film.

The adhesive has the following composition:

45% of a commercially available saturated epoxy resin modified by methacrylic acid;
45% dimethylaminoethyl methacrylate;
10% ethylene glycol acrylate.

One of the faces of each plate is coated with said adhesive, whereupon the two plates are assembled together. The operations already described are then performed. It is observed that the resin has completely polymerized after sixteen hours and ensures perfect glass-to-glass adhesion.

EXAMPLE 11

By means of the method in accordance with the invention as contemplated in this example, a rigid glass sheet of substantial thickness is directly bonded to a rigid polycarbonate sheet of substantial thickness without interposition of a thin plastic film. In addition, the adhesive employed has the following composition:

50% of a commercially available epoxy-acrylate resin of the type designated as Ebecryl-600;
50% diethylaminoethyl methacrylate.

There is thus obtained a product which offers the following advantages over a simple glass: condensation on the wall of the laminated product is avoided, reflection phenomena are no longer present; and resistance to fragmentation is increased to an appreciable extent. It can readily be understood that these properties are maintained when a plastic film is provided in addition.

It should be added that the use of diethylaminoethyl methacrylate in the adhesive is not related to the fact that the glass is bonded directly to the polycarbonate. This adhesive composition could have been employed in the previous examples.

Referring now to the accompanying figures, one mode of execution of the method in accordance with the invention will now be described in greater detail.

FIG. 1 is a simplified illustration of a bag which permits uniform application of said pressure. The bag 2 is made of flexible plastic material, for example, and is provided with an opening (not shown in the drawings) for the introduction of the sandwich which is intended to constitute the glass laminate and is designated by the general reference 4. Said bag is also fitted with means for sealing-off said opening. Provision is made in addition for a duct through which air can be removed from the bag as the pressure is being applied. As mentioned earlier, the sandwich 4 is constituted by two glass plates 8 and 8' between which is placed a plastic film of polyvinyl butyral, for example. There are also shown in this figure the two layers 12 and 12' of adhesive substance, the thickness of which has been purposely exaggerated. In order to maintain the relative positions of the two glass plates before the coating resin produces a bonding action on the two glass plates, an external frame 14 can be employed with the sole object of preventing relative displacements of the two glass plates. It is understood that, when the bag containing the sandwich 4 is immersed to a sufficient depth in a pool represented diagrammatically by the line 16, this immersion has the effect of applying to the glass plates a uniform pressure having a value which is determined by the depth of immersion. As shown in chain-dotted lines in the figure, the bag 2 undergoes progressive deformation as the depth of immersion increases, thus having the effect of degassing or discharging the air contained therein. Since said bag is completely deformable, the pressure is transmitted directly to the external faces of the plates of glass or polycarbonate. The application of this pressure therefore permits removal of the air or gas bubbles such as the bubbles 18 which may be trapped in the adhesive.

As can readily be understood, there would be no modification whatsoever if the laminated product were constituted solely by a sheet of glass and a sheet of polycarbonate.

Figure 2:
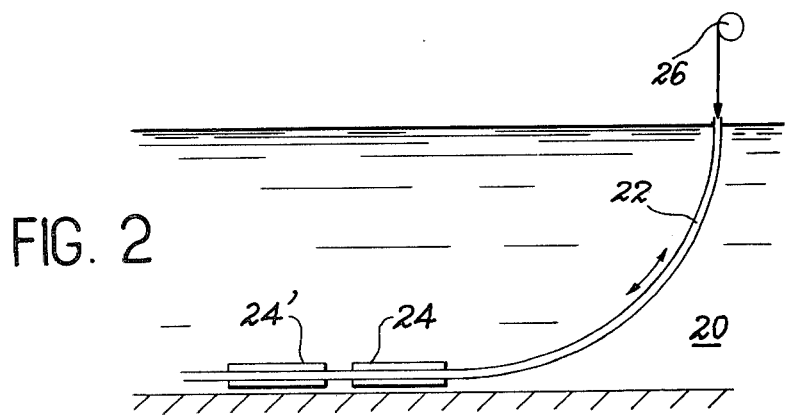
FIG. 2 shows a first embodiment of the device or of the installation for applying said pressure.

FIG. 2 is a view in elevation showing a simplified form of construction of the immersion installation in which the pressure can be applied until prepolymerization is obtained. In this embodiment, provision is made for a pool 20 equipped with guide rails 22 and units 24 which comprise on the one hand the bag 2 and on the other hand means for cooperating with the guide rails 22. The means employed for producing upward and downward displacement of the bag structures 24 and 24' are represented schematically by the winch 26. It will be understood that one of the advantages of this arrangement lies in the fact that the hydrostatic pressure applied to the sandwich which is intended to constitute the glass laminate increases progressively as the depth of immersion increases and that, during this stage of downward displacement, a pressure difference exists between the top portion and the bottom portion of the sandwich. This has a favorable effect on removal of the bubbles 18 which are included in the layers 12 and 12' of adhesive.

In the foregoing description of the installation for the manufacture of a transparent laminated product, only the portion concerning the application of pressure has been considered in detail. A complete installation would clearly include a station for coating glass plates with adhesive as well as a station for handling said plates and positioning of the plastic film. These stations are of known type and do not call for any description.

Similarly, when making use of an external frame 14 prior to introduction of the sandwich into the bag, it is also necessary to provide a station for placing the frame in position and a station for withdrawal of the frame and subsequent storage of glass laminates at a suitable temperature until complete hardening of the adhesive has taken place. A single frame could clearly be employed for the purpose of clamping a plurality of sandwiches placed in adjacent relation.

It is clearly apparent from the foregoing description that, by virtue of the different stages and different means which are contemplated for its application, the method according to the invention provides a perfect answer to the requirements of large-scale production of transparent laminated products at a cost which is kept to a minimum. This satisfactory result arises from the fact that all the stages of the method take place at room temperature or at temperatures in the vicinity of room temperature, thus solving all problems relating to heat insulation. A further reason for the achievement of this result lies in the fact that the operations mentioned above take place at values of overpressure which do not exceed one bar. In consequence, there is practically no pressurization problem since this low value of pressure can be obtained at low cost in accordance with the invention by momentary immersion in a pool.

The entire description given above with reference to FIGS. 1 and 2 related to the case in which the sandwich is a two-layer laminate but it remains apparent that this description is wholly applicable to the case of a laminate made up of n glass plates.

The method also makes it possible to bond a transparent plastic sheet to either one or both external faces of the sandwich. This possibility may be of special interest in the fabrication of windshields.

We claim:

1. An adhesive substance for bonding together two parts at a prepolymerization temperature between approximately 10°–80° C. and at a pressure below 2 bar in which at least one of said parts is of glass, wherein said substance contains at least one resin selected from the group consisting of acrylic and methacrylic esters of epoxy resins representing between 20 and 60% by weight of said substance and a tertiary amine methacrylate representing 40 to 80% by weight of said substance.

2. An adhesive substance according to claim 1, wherein the tertiary amine is selected from the group consisting of diethylaminoethyl, dimethylaminoethyl and tert-butylaminoethyl.

3. An adhesive substance according to claim 1, wherein said substance comprises a polar monomer which is capable of improving the adhesion of said substance, said monomer being selected from the group comprising ethylene glycol acrylate and ethylene glycol methacrylate, and representing between 0 and 20% by weight of said substance.

4. An adhesive substance according to claim 1, wherein said substance contains 0 to 15% by weight of a polyunsaturated monomer selected from the group constituted by diethylene glycol diacrylate, tetraethylene glycol diacrylate, polyethylene glycol diacrylate, hexanediol diacrylate, pentaerythrytol tetraacrylate.

5. An adhesive substance according to claim 1, wherein said substance contains 0 to 5% by weight of a peroxide selected from the group constituted by lauroyl peroxide, benzoyl peroxide, p-chlorobenzoyl peroxide.

6. An adhesive substance according to claim 1, wherein said substance contains 0 to 1% by weight of a polymerization inhibitor selected from the group comprising hydroquinone monoethylether and hydroquinone.

7. An adhesive substance for bonding together two parts at a prepolymerization temperature between approximately 10°–80° C. and at a pressure below 2 bar in which at least one of said parts is of glass, wherein said substance contains at least one resin selected from the group consisting of acrylic and also methacrylic esters of epoxy resins representing between 20 and 60 percent by weight of said substance and a tertiary amine methacrylate representing 40 to 80 percent by weight of said substance, said tertiary amine being selected from the group consisting of diethylaminoethyl, dimethylaminoethyl and tert-butylaminoethyl.

8. An adhesive substance for bonding together two parts at a prepolymerization temperature between approximately 10°–80° C. and at a pressure below 2 bar in which at least one of said parts is of glass, wherein said substance contains at least one resin selected from the group consisting of acrylic and methacrylic esters of epoxy resins representing between 20 and 60 percent by weight of said substance and a tertiary amine methacrylate representing 40 to 80 percent by weight of said substance, wherein the tertiary amine is selected from the group consisting of diethylaminoethyl, dimethylaminoethyl and tert-butylaminoethyl, and wherein the epoxy resin is selected from the group consisting of the epoxyacrylate resins and the epoxymethacrylate resins.

* * * * *